(12) United States Patent
Bocchieri et al.

(10) Patent No.: US 10,641,584 B2
(45) Date of Patent: May 5, 2020

(54) ENERGY ABSORBING STRUCTURES FOR UNDERBODY BLAST PROTECTION

(71) Applicant: Applied Research Associates, Inc., Albuquerque, NM (US)

(72) Inventors: Robert T Bocchieri, Mountain View, CA (US); Christina Wagner, Mountain View, CA (US); Robert MacNeill, San Carlos, CA (US); Steven W Kirkpatrick, Redwood City, CA (US)

( * ) Notice: Subject to any disclaimer, the term of this patent is extended or adjusted under 35 U.S.C. 154(b) by 113 days.

(21) Appl. No.: 16/053,681

(22) Filed: Aug. 2, 2018

(65) Prior Publication Data

US 2019/0137223 A1    May 9, 2019

Related U.S. Application Data

(62) Division of application No. 15/080,434, filed on Mar. 24, 2016, now Pat. No. 10,054,402.

(60) Provisional application No. 62/137,809, filed on Mar. 24, 2015.

(51) Int. Cl.
| F41H 7/04 | (2006.01) |
| B62D 21/15 | (2006.01) |
| F41H 5/013 | (2006.01) |

(52) U.S. Cl.
CPC ............. *F41H 7/042* (2013.01); *B62D 21/15* (2013.01); *F41H 5/013* (2013.01)

(58) Field of Classification Search
CPC . F41H 5/013; F41H 5/02; F41H 5/023; F41H 5/06; F41H 5/16; F41H 7/042; B62D 21/15

USPC .............. 296/187.07, 187.08, 193.07
See application file for complete search history.

(56) References Cited

U.S. PATENT DOCUMENTS

| 7,997,182 | B1 * | 8/2011 | Cox | .................... F41H 7/042 296/187.07 |
| 8,033,208 | B2 | 10/2011 | Joynt et al. | |
| 8,146,477 | B2 | 4/2012 | Joynt | |
| 8,627,757 | B2 * | 1/2014 | Tobie | ....................... F41H 5/007 89/36.04 |
| 8,707,848 | B2 * | 4/2014 | Allor | ........................ F41H 7/042 89/36.01 |
| 8,844,970 | B2 | 9/2014 | Gras et al. | |
| 8,899,652 | B2 | 12/2014 | Brill et al. | |

(Continued)

FOREIGN PATENT DOCUMENTS

DE    102010016605 A1 * 10/2011 ............... F41H 5/04

*Primary Examiner* — Jason S Daniels
(74) *Attorney, Agent, or Firm* — Dinsmore & Shohl LLP; Monika L. Jaensson, Esq.

(57) ABSTRACT

The present technology regards a de-coupled V-hull structure for use with an armored vehicle, and energy absorbing crush elements suitable for mounting the V-hull structure in a de-coupled manner to the vehicle. The energy absorbing V-hull structure includes a sloped armor structure forming a cavity having a v-shaped cross-section and a plurality of reinforcing elements, including a backbone, hull stiffeners and lateral supports. The elements are coupled together and supported by energy absorber mounts, extending along each side of the structure. Crush elements suitable for decoupling the V-hull structure are also disclosed, having a uniquely designed housing, a plurality of plates positioned within the housing, and affixation means for securing the crush element to the underside of the vehicle and to the top of the V-hull structure.

24 Claims, 9 Drawing Sheets

(56) References Cited

U.S. PATENT DOCUMENTS

2006/0237976 A1   10/2006  Glasgow et al.
2010/0218667 A1*  9/2010  Naroditsky ............. F41H 7/042
                                                                       89/36.02
2016/0159401 A1*  6/2016  Batt ........................ F14H 7/042
                                                                      296/187.07

\* cited by examiner

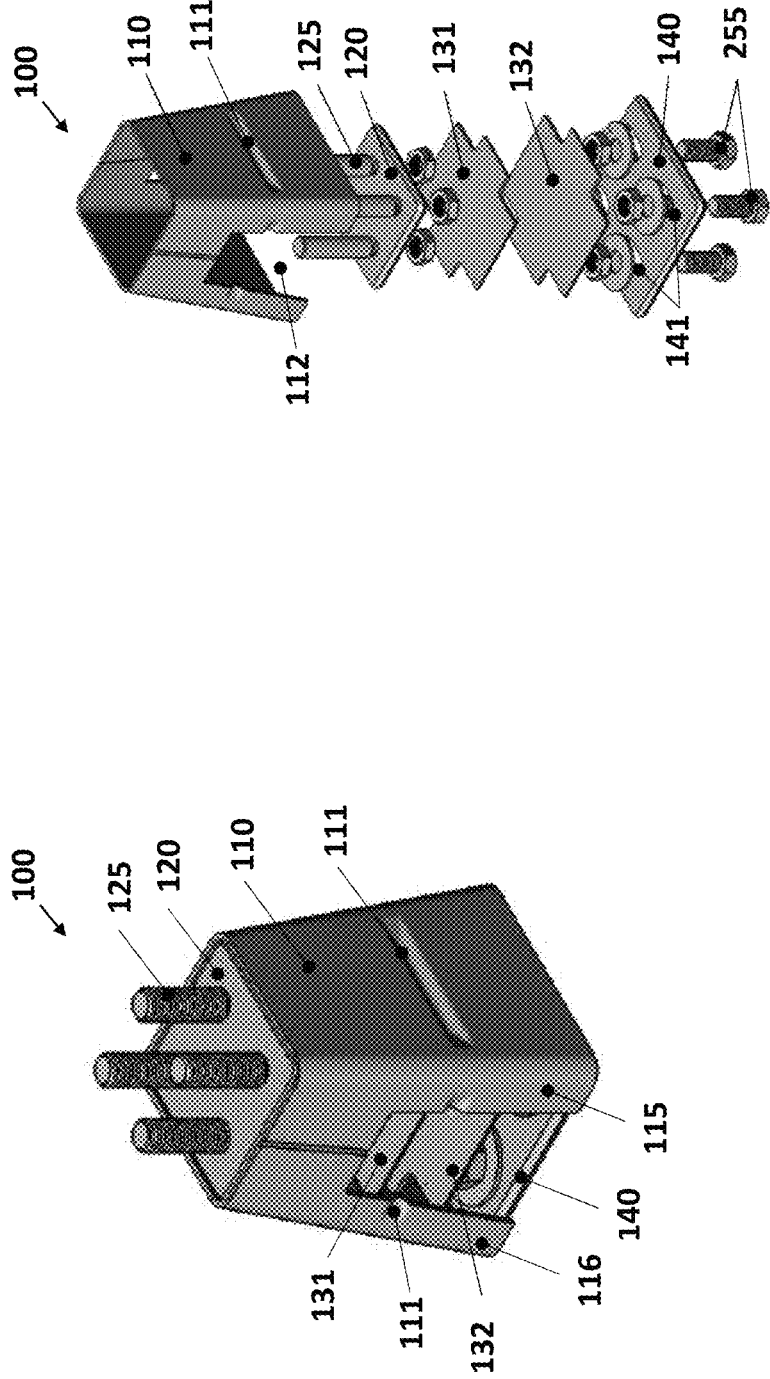

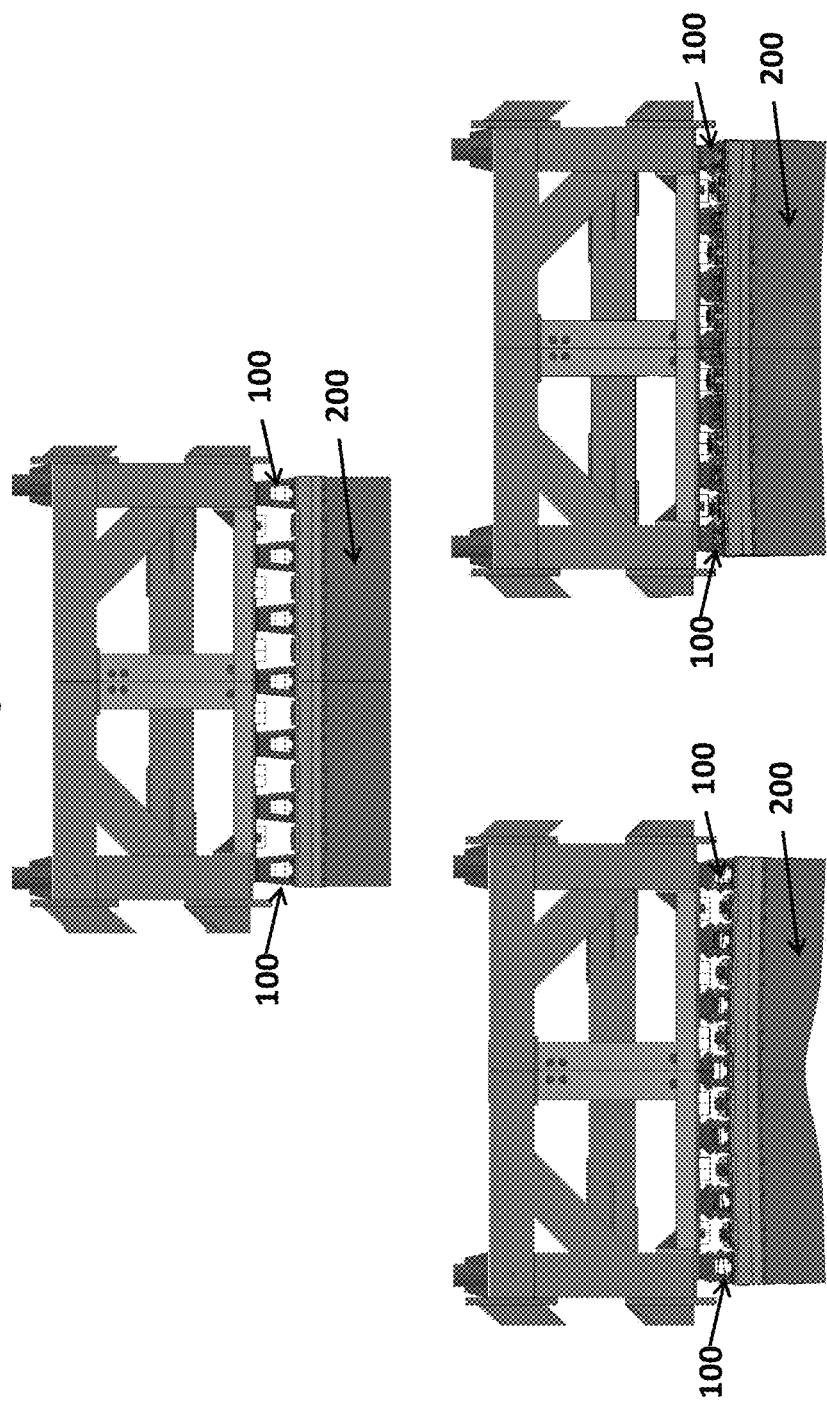

ENERGY ABSORBING STRUCTURES FOR UNDERBODY BLAST PROTECTION

STATEMENT REGARDING FEDERALLY SPONSORED RESEARCH OR DEVELOPMENT

This invention was made with Government support under agreement with the Office of Naval Research, Contract No. N00014-12-C-0497. The Government has certain rights in the invention.

BACKGROUND OF THE TECHNOLOGY

The disclosed technology regards energy absorbing structures for underbody blast protection. More specifically, the disclosed technology includes novel energy absorbing cruciform crush elements (CCE) and a de-coupled V-hull structure attachable to a vehicle by crush elements, such as the energy absorbing cruciform crush elements disclosed.

To protect military vehicles from destruction, and passengers from injury when subjected to underbody mine or improvised explosive device (IED) attacks, V-hull structures are incorporated into and coupled with the underside of wheeled armored personnel carriers (APCs), infantry mobility vehicles and infantry fighting vehicles (IFVs). By their design, upward directed blasts are deflected away from the vehicle. Further, the angular faces of the V-hull increase the amount of material a ballistic projectile must pass through in order to penetrate the vehicle.

V-hulls are typically coupled with the vehicle's monocoque or body-on-frame chassis, or even directly to the crew compartment. In light armored vehicles (5-10 tons), where underbody blasts create large vertical loading, V-hulls can currently resist projectile breaching, but they quickly transmit vertical loads into the crew compartment. In some armored vehicles, seat and floor structures are provided with energy absorption components to mitigate injuries to crew from underbody blasts; however, occupants can still suffer severe injury.

The present technology improves survivability of lightweight armored vehicles and reduces injury to its crew by absorbing energy before it is transmitted to the vehicle/crew compartment, wherein the underbody hull comprises energy absorbing reinforcing elements, being de-coupled from the crew compartment using energy absorbing (EA) structures. This novel approach of decoupling the V-hull by crush elements can work with currently available technology, such as EA seating and flooring, to further enhance survivability.

By the V-hull's de-coupled attachment to the vehicle and its novel reinforcing structure and configuration as herein described, a significant decrease in blast-induced accelerations transmitted to the crew compartment of a vehicle can be achieved. Further, the EA crush elements provide a uniform and effective crush, absorbing energy from the blast; and the novel sliding affixation of the crush elements to the V-hull as hereinafter described further mitigate blast-induced structural motions.

GENERAL DESCRIPTION OF THE TECHNOLOGY

The disclosed technology regards an energy absorbing crush element for coupling a V-hull to the underside of a vehicle, and an energy absorbing V-hull structure intended to be de-coupled to the underside of a vehicle.

The crush element of the disclosed technology includes a housing, a plurality of plates positioned within the housing, and means for securing the crush element to both the underside of the vehicle and to the top of a V-hull.

The housing of the crush element is in the geometrical shape of a truncated rectangular pyramid, with a cross-sectional area decreasing from its base to its top, to provide stability of the element and its crush when subjected to off-axis loads. Each side of the housing has a horizontal surface cavity formed thereon to guide a uniform crush of the element when subjected to a blast or load. By its location, this surface cavity dictates the location of the first buckle of the crush element when subjected to a blast-induced load, and controls the uniform crush of the element; by its size and with other features of the crush element, the cavity further controls the load at which buckling will begin. Further, two sides, opposing one-another, have an opening extending from the base of the housing up through the surface cavity, to adjust the crush load of the element, facilitate its deformation when subjected to a blast or load, and allow access to securing nuts or other securing means within the housing for affixation to the vehicle and the hull structure.

The plates are sized to fit within the housing, and include a top plate, a base plate and one or more cruciform plates. Apertures in the top plate receive threaded studs for affixation to corresponding mounting plates positioned along the sides of the vehicle floor. The mounting of such elements at the vehicle sidewalls, between the floor of the vehicle and the hull, directs blast-induced loads away from the vehicle floor. Oblong apertures (or slots) in the base plate receive bolts for affixation to the V-hull, and allow lateral movement of the crush element relative the V-hull when subjected to load or blast, further absorbing energy from the blast and facilitating additional energy absorption by the V-hull structure. The cruciform plates are affixed within the housing to increase load tolerance and facilitate uniform crush of the element when subjected to a blast, wherein the element will buckle in a controlled manner, above and below each of the cruciform plates, when subjected to a load (rather than an uncontrolled buckling out). With two cruciform plates affixed within the interior channel of the element, the element can uniformly crush with three buckles, and thereby absorb energy while retaining structural integrity to maintain de-coupled affixation of the V-Hull to the vehicle.

The novel EA crush element mitigates blast-induced structural motions with its designed crush load, total energy absorbed, geometry and its sliding attachment to the V-hull, and functions well with both axial and high off-axis loads.

The energy absorbing V-hull structure of the disclosed technology includes a sloped armor structure forming a cavity having a v-shaped cross-section. The structure further includes a plurality of reinforcing elements to resist lateral and longitudinal buckling of the hull, including a backbone extending longitudinally at the base of the armor structure, hull stiffeners affixed at one end to the backbone and extending laterally toward the top edges of the hull, and lateral energy absorbing supports, extending across the top of the V-hull cavity. The backbone improves the centered blast survivability of the hull by reducing plate deformation, restraining longitudinal deformation and by maintaining connection to the hull stiffeners. The hull stiffeners restrain lateral deformation of the V-hull plate. The lateral energy absorbing supports resist hull expansion when subjected to a blast. The reinforcing elements may be constructed from high specific strength steel and stiffness/bendability, with thin walls, to facilitate energy absorption and maintain some integrity of the structure when subjected to blast-induced loads.

EA mounts are also provided, extending along each side of the V-hull structure, designed to couple with a plurality of EA crush elements. The mounts may be a pair of solid beams designed to receive an edge of the hull, and support and secure the hull stiffeners, the lateral energy absorbing supports, and the crush elements. The beams are secured to the structure by mount bolts extending through apertures in the beams and the hull. When subjected to a blast, the beams stiffen the edges of the hull and transfer the blast-induced load from the lateral stiffeners to the EA structures.

The de-coupled V-hull structure of the disclosed technology enables the EA crush element to function as designed, with a specialized mount for the cruciform crush elements to grip the V-hull and the hull stiffeners. By these configurations the EA crush elements and the V-hull structure withstand blast loads, including high off-axis loads, absorbing energy therefrom, thereby significantly reducing blast-induced acceleration at the vehicle floor and seats of the crew compartment.

DESCRIPTION OF THE DRAWINGS

A more complete understanding of the present technology, and the attendant advantages and features thereof, will be more readily understood by reference to the following detailed description when considered in conjunction with the accompanying drawings wherein:

FIG. 1 is a peripheral view of an embodiment of the EA crush element of the disclosed technology.

FIG. 2 is a disassembled view of the embodiment of the crush element shown in FIG. 1.

FIG. 6 depicts a test configuration for the disclosed technology, and simulated results from axial and off-axis blasts.

DETAILED DESCRIPTION OF THE TECHNOLOGY

Figure 3A:
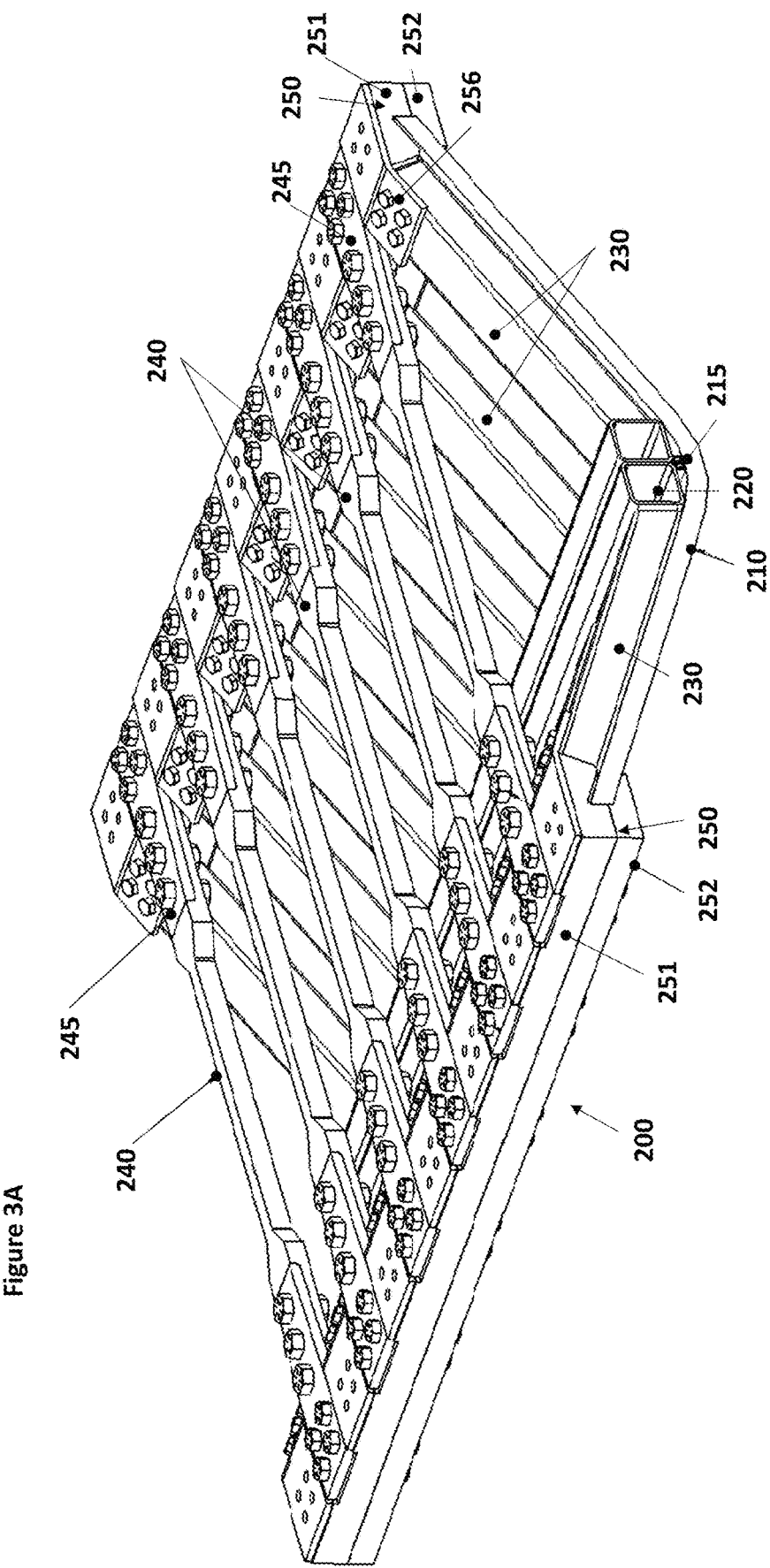
FIGS. 3A and 3B are perspective views of an embodiment of the energy absorbing V-hull structure of the disclosed technology.

The disclosed technology regards an energy absorbing crush element for coupling a V-hull to the underside of a vehicle, and an energy absorbing V-hull structure intended to be de-coupled to the underside of a vehicle. Embodiments of the disclosed technology and components thereof are shown in FIGS. 1-2. Following is a detailed description of the technology and embodiments thereof, concluding with results from simulated and actual testing of the disclosed technology, demonstrating its effectiveness at absorbing blast-induced energy while maintain structural integrity.

Energy Absorbing Crush Element

The present technology regards an energy absorbing crush element for coupling a V-hull to the underside of a vehicle, an embodiment of which is shown in FIGS. 1 and 2. As shown in the figures, the crush element 100 includes a housing 110 in the shape of a truncated rectangular pyramid having an interior channel, and a plurality of plates affixed within the channel, in a parallel configuration.

In some embodiments, such as the embodiments shown in FIGS. 1 and 2, the housing 110 is in the geometrical shape of a truncated square pyramid, with rounded edges extending inwardly, up from the base at an angle (e.g., 5.7°) from vertical. In the embodiment shown, the housing has a height of about 7.25", with a base width of about 6", and a top width of about 4.5". Other similar dimensions may be suitable, based upon the size and weight of the vehicle and the V-hull. For purposes of describing embodiments of the EA crush element, reference is made to a midplane and a quarterplane of the housing, meaning the planes extending horizontally across the interior channel of the housing, at the midpoint and quarterpoint of its height from the base, respectively.

The housing 110 may be constructed from a pair of plates 115, 116, each plate being twice bent to form one side of the housing, edges and corresponding halves of adjacent sides of the housing. In this embodiment the plates are affixed to each other, by welding, at their respective ends to form the truncated rectangular pyramid of the housing.

Formed on each side of the housing is a horizontal indent or surface cavity 111, positioned at or below the midplane of the housing. In the embodiment shown in FIGS. 1 and 2, the surface cavity 111 is about 0.5" below the midplane of the housing. The surface cavity shown in this embodiment has a width of about 4", a height of about 0.6" and a depth of about 0.2"; other similar dimensions may be suitable, based in part upon the size of the housing. The position of the cavity should be the same on each side of the housing to facilitate a uniform crush of the element when subjected to a blast-induced load.

One or more sides of the housing 110 may have similarly sized openings 112. As shown in the embodiment of FIGS. 1 and 2, the openings 112 may be on two opposing sides, having a width of about 3.4" at the base of the housing, and extending through the surface cavity 111 (thereby bisecting the cavity) at the same angle as the angle from vertical of the housing edges. The size of the opening, with other features of the crush element, determines the load at which the element begins to crush and the crush load; the wider the opening, the lower the loads.

The crush element further comprises a plurality of plates affixed to the sides of the housing, across its interior channel, including a top plate 120, one or more cruciform plates 131, and a base plate 140. As shown in FIG. 1, the top plate 120 is affixed within the top of the housing 110, to form a planar top surface of the crush element 100 with the top of the housing. The top plate 120 may comprise a plurality of tapped holes or apertures to receive threaded studs 125, allowing coupling of the element to a vehicle frame, chassis or underbody by means of the threaded studs.

Similarly, as shown in FIG. 1 the base plate 140 is affixed within and forms the bottom surface of the crush element 100, with the edge of the housing 110. The base plate comprises a plurality of apertures 141, as shown in FIG. 2, allowing coupling of the element to a V-hull structure, as hereinafter described. In the embodiment shown the apertures are oblong in shape (or slots) to allow lateral movement of the element 100 relative the V-hull when subjected to load or blast. The bottom and/or top surface of the base plate may further comprise a layer of low friction material, such as glass PTFE (polytetrafluoroethylene) tape, bonded or otherwise affixed thereto to facilitate movement of the element 100 relative to the V-hull, causing a more uniform crush of the element when subjected to off-axis blasts.

Likewise, the securing structure, such as washers, may be coated with a similar layer of low friction material, to further facilitate such movement of the element 100 relative to the V-hull.

One or more cruciform plates are affixed within the housing channel of the disclosed technology. As shown in the embodiment of FIGS. 1 and 2, two cruciform plates 131, 132, are affixed to and positioned within the interior channel of the housing 110. The cruciform shape of these plates is designed so that the void corners accommodate the rounded edges of the housing and allow the ends of the cruciform plates to be secured within the housing. In this embodiment, the first cruciform plate 131 is affixed at about the midplane of the housing, and the second cruciform plate 132 is affixed at about the quarterplane of the housing. Because the cross-sectional dimensions of the housing decreases from the base to the top of the housing, each plate 131, 132 is sized so that it may be affixed at its ends to the housing, at the desired position.

Each of the housing 110 and the plates 120, 131, 132 and 140, may be constructed from stainless steel, such as 304L stainless steel, having a thickness of between 9-11 gage, although a thinner gage would be suitable when crush is desirable at lower loads, and a thicker gage would be suitable when design dictates a higher load crush threshold. The edges/ends of the plates 120, 131, 132 and 140 may be beveled, and the interior walls of the housing 110 may comprise a plurality of grooves, to facilitate through-thickness beveled welds of each plate within the channel of the housing 110.

To allow affixation of the crush element 100 to the underside of a vehicle, a plurality of threaded studs 125 as shown in FIGS. 1 and 2 may be provided, extending through the apertures 121 in the top plate, and secured to the underside of the plate by means of a nut or other securing structure. Similarly, to allow affixation of the crush element to a V-hull, a plurality of bolts 255 may be provided, extending through the apertures 141 of the base plate, and secured on the inner surface of the base plate by means of a washer and nut, or other securing structure.

The described energy absorbing crush element, by its structure and configuration, provides a novel structural energy absorber for underbody blast mitigation in the form of a cruciform crush element. The shape and position of the housing with the surface indents and the cruciform plates facilitate an engineered crush load, providing good actuation and large off-axis loading, capable of absorbing high tensile loads as well as compression loads while maintaining structural integrity through and after the crush. Embodiments of the crush element described herein have an engineered crush load of between about 90 and 140 kips depending on the loading rate and degree of off-axis loading, and are believed to be capable of handling off-axis loading at least up to 13 degrees off the axis. Further, the EA crush elements of the disclosed technology have good structural strength and stiffness in general service, and are capable of withstanding harsh environments (e.g., heat, corrosion resistance, dirt).

Figure 4A:
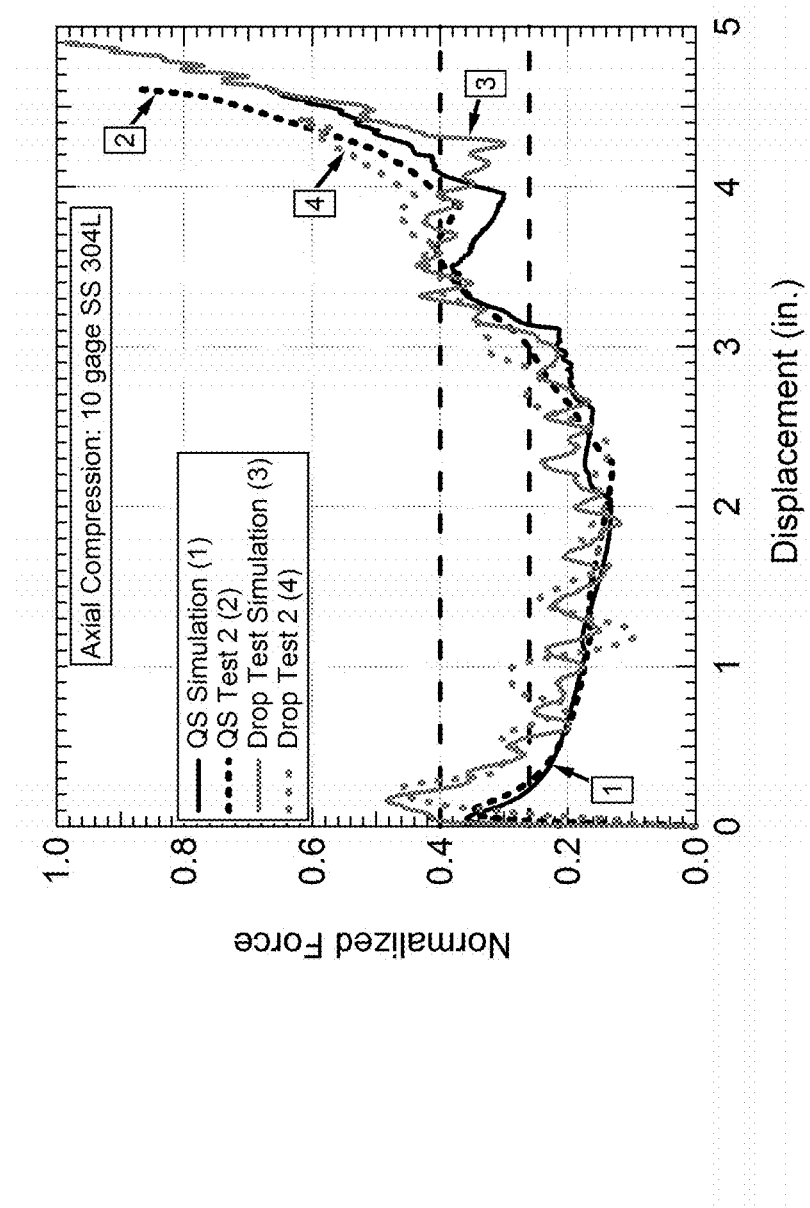
FIG. 4A shows Force-displacement response of CCE in the axial configuration.
Figure 4B:
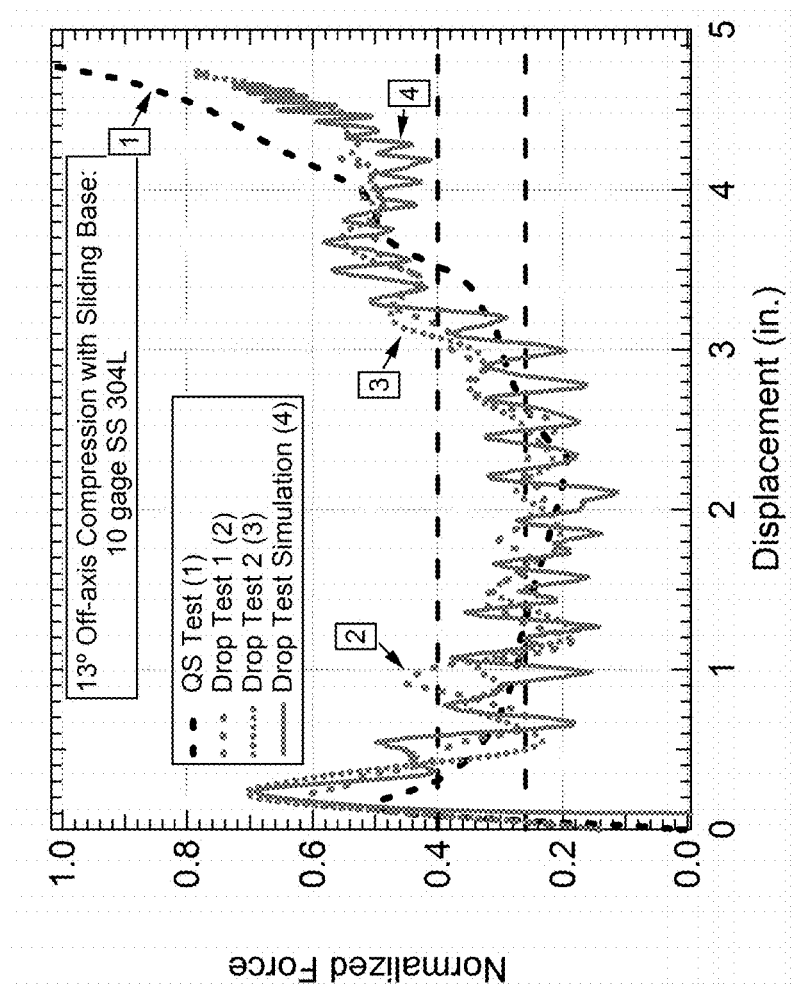
FIG. 4B shows Force-displacement response of CCE in the 13° off-axis configuration.
Figure 5A:
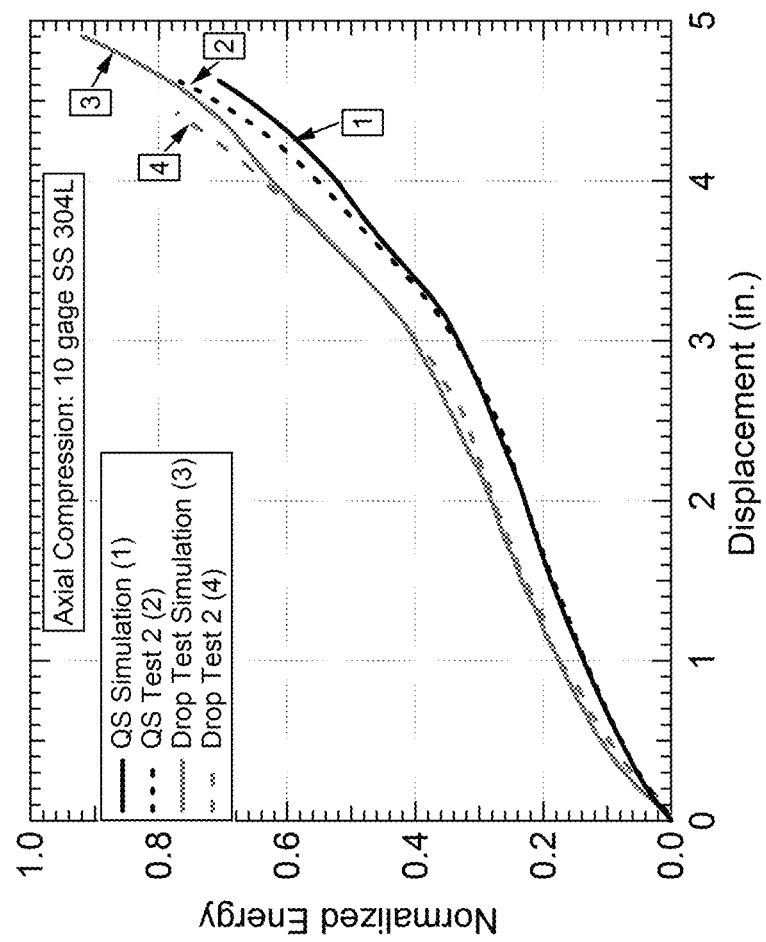
FIG. 5A shows Crush energy versus displacement response of CCE in the axial configuration.
Figure 5B:
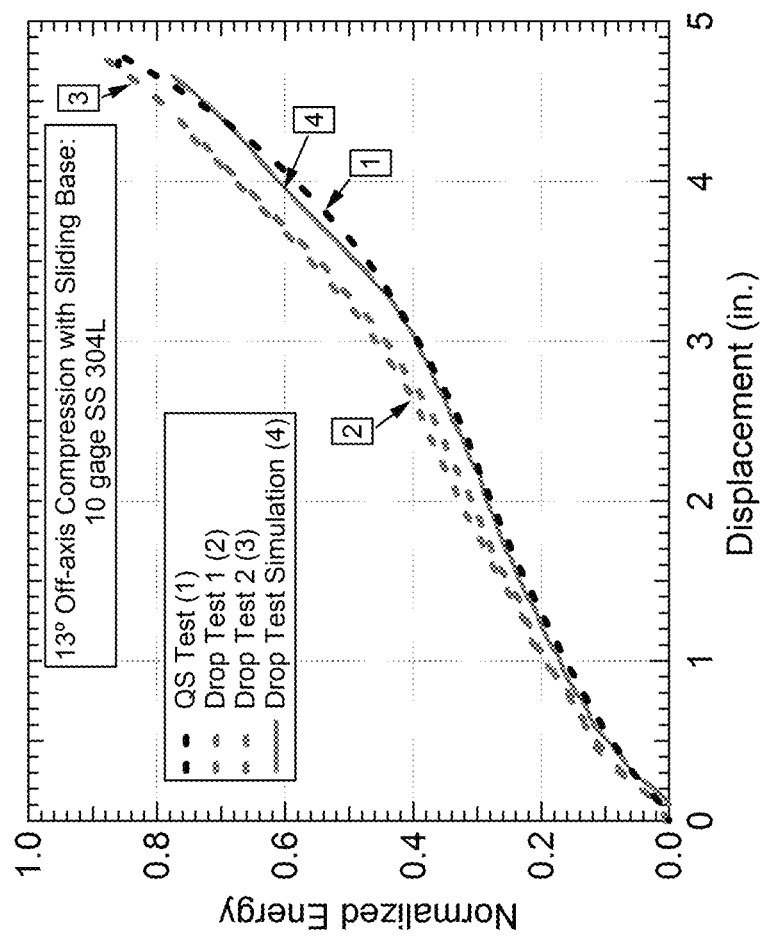
FIG. 5B shows Crush energy versus displacement response of CCE in the 13° off-axis configuration.

Based upon simulated and actual testing, embodiments of the crush element of the disclosed technology triggers and manages element buckling (crush) in the range of 90 to 140 kips. This controlled buckling was proven in both an axial drop test and a 13° off-axis drop test. Shown in FIG. 4 are results from real and simulated quasi-static (QS) and drop tests, showing the axial force versus displacement (crush) of the crush element. The simulation results show good agreement with the actual tests. Total energy absorbed as a function of stroke (displacement) for these real and simulated tests are shown in FIG. 5. As revealed by these results, the simulated response closely matches test results allowing accurate prediction of their performance when used in vehicles. Post-crush, the elements showed good structural integrity so that after subjected to a blast, the V-hull remains affixed to the vehicle by means of the crushed elements.

De-Coupled V-Hull Structure

Figure 3B:
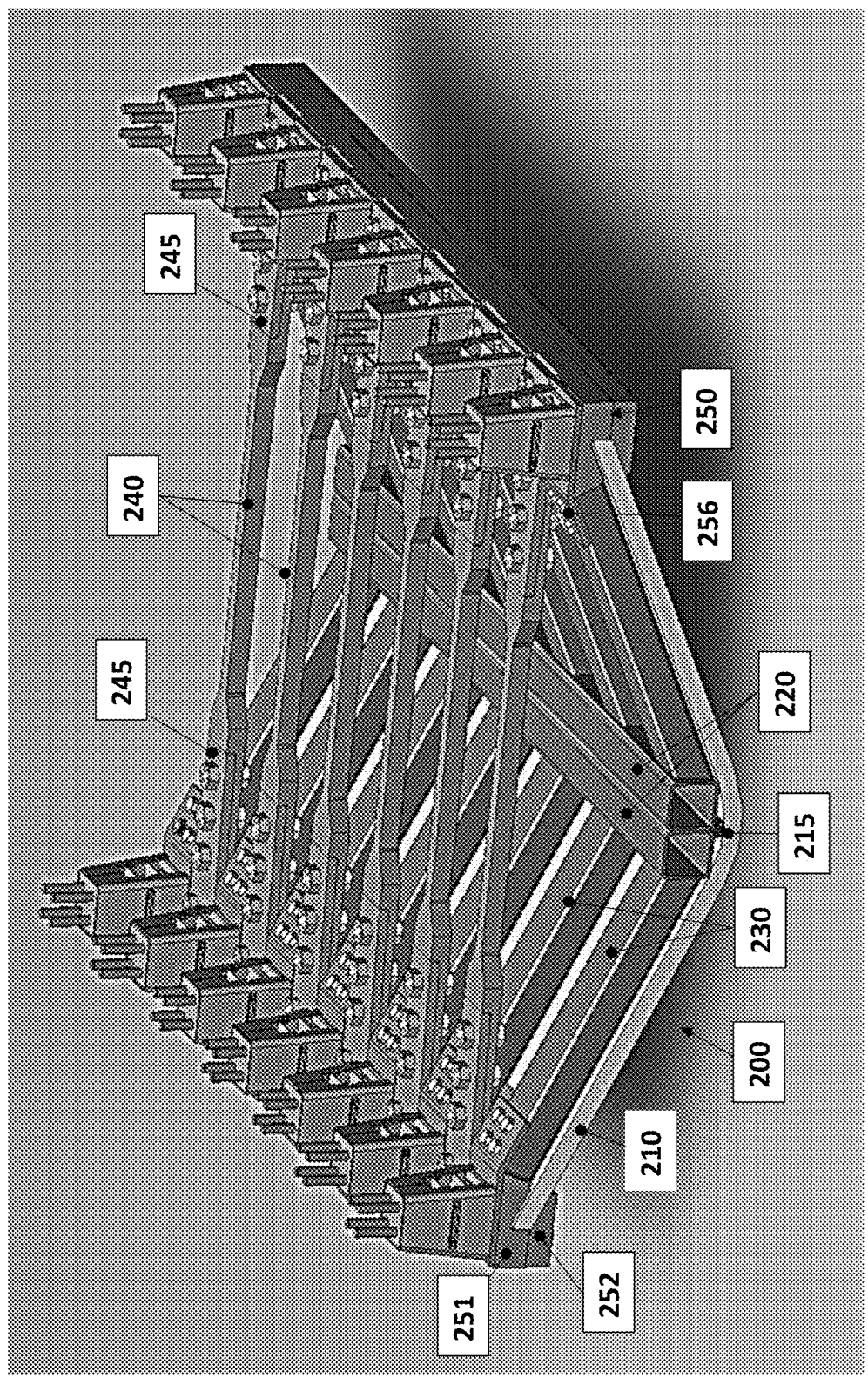

The present technology further regards an energy absorbing structure intended to be de-coupled to the underside of a vehicle, for underbody blast protection. As shown in FIGS. 3A and 3B, this energy absorbing structure 200 includes a reinforced sloped armor structure or hull 210 forming a cavity having a v-shaped cross-section, and extending to opposing edges. The energy absorbing structure 200 further includes energy absorber mounts 250 designed to couple with energy absorbing crush elements 100, such as those described above, which elements couple with a vehicle.

The hull 210 is made from aluminum armor (such as 5083-H131), and provides ballistic protection to the exterior surface of the energy absorbing structure, deflecting projectiles from the vehicle. In this embodiment the hull has a width of about 65", a height of between 15-16" and a depth of about 75". As shown in FIGS. 3A and 3B, the hull 210 is reinforced by multiple reinforcing elements, including a backbone 220, a plurality of stiffeners 230, and a plurality of lateral energy-absorbing supports 240. The reinforcing elements are not affixed directly to the hull 210.

The backbone 220 may be one or more beams or tubes made from highly deformable, high strength steel, extending longitudinally at the base of the hull. In the embodiment of the disclosed technology shown in FIGS. 3A and 3B, the backbone is formed from two rectangular tubes (such as STRENX 700 thin-walled tubes, manufactured by SSAB), laterally welded together. The backbone may include a support structure, such as a pair of smaller, energy absorbing tubes 215, affixed lengthwise at the center of the backbone's undersurface, and extending along the length of the backbone. In the embodiment shown each energy absorbing tube 215 is attached to one of the rectangular tubes of the backbone 220. The tubes 215, which may be made from stainless steel, have a height designed to maximize the crush distance of the tubes 215 between the hull 210 and the middle of the backbone 220. By this structure and configuration, the crush of the EA tubes 215 absorb energy from blast-induced loads from the deforming hull 210 and transfer the loads more gradually to the backbone 220.

As shown in FIGS. 3A and 3B, the hull 210 is further reinforced by a plurality of hull stiffeners 230, each stiffener being affixed at one end to the backbone 220, and extending laterally on each side of the hull 210 toward its top edges. The hull stiffeners may also be STRENX 700 thin walled tubes providing high specific strength and stiffness, as well as high bendability to absorb blast loads.

Lateral energy-absorbing supports 240 also reinforce the hull, extending across the top of the V-hull cavity. As shown in FIGS. 3A and 3B, the lateral supports may have a dogbone shape, and are designed to absorb energy by deforming plastically as the hull deforms outwards when subjected to a blast or load, thereby restraining lateral V-hull deformation. The lateral energy-absorbing supports may be made from steel, such as A572 Grade 50 steel.

The hull 210, and the reinforcing elements 230 and 240, are coupled to form the energy absorbing structure 200 by energy absorber mounts 250, extending along each side of the structure 200. As shown in the embodiment of FIGS. 3A and 3B, the mounts 250 may include a pair of solid beams 251, 252, removably affixed about the edges of the hull 210.

Each of the beams 251, 252 has a corresponding angular recess extending along its length to receive an edge of the hull 210. As shown in FIGS. 3A and 3B, the top beam 251 may have an angled interior edge to abut the upper end of the hull stiffeners 230. The beams 251, 252 are affixed together, about the edge of the hull, by mount bolts 255 extending through corresponding apertures in the beams and the hull, the mount bolts being secured by nuts or similar securing structure. The beams may be made from a lightweight metal, such as aluminum 6061-T6.

In the embodiment of FIGS. 3A and 3B, the hull stiffeners 230 are secured to the top beam by means of a bent plate 256, with an inclined portion thereof positioned on top of each stiffener, at its end, and a planar portion extending over the surface of the top beam 251. The plate may be affixed to the top surface of the stiffener by means of a plurality of bolts (secured by nuts or other securing means) extending through corresponding apertures in the stiffener surface, and may be secured to the top beam 251 by the mount bolts 255.

FIG. 3 further depicts a manner of affixing the lateral energy absorbing supports to the beam 251 by means of affixation bars (or gussets) 245, wherein the lateral supports have planar recesses at each end to receive an end of the affixation bar. In this embodiment the affixation bars and lateral energy absorbing supports have a plurality of corresponding apertures to allow affixation of the bar to the top beam 251 (by means of the mount bolts 255), and to the lateral supports, by means of a plurality of bolts secured by nuts or similar securing structure.

Finally, in the embodiment of the disclosed technology shown in FIGS. 3A and 3B, the hull stiffeners 230 and the lateral energy absorbing supports 240 are alternatingly positioned along the length of the hull 210, with the EA crush elements 100 slidingly secured to the mounts 250, above the plates 251, by means of the mount bolts 255.

Simulated nonlinear dynamic finite element analysis (FEA) of blasts on the V-hulls of the disclosed technology, secured to a test structure by means of the EA crush elements of the disclosed technology were conducted for high explosives buried in wet sandy gravel. As shown in FIG. 6, the crush elements of the disclosed technology were mounted to a test surrogate, representing the weight of a light armored vehicle, on the underside of the doorsill. Results from two configurations are shown in the figure, one with the blast centered under the V-hull and the second with the blast offset one quarter of the width of the V-hull. Both cases show uniform crushing of the crush elements along the length of the V-hull. Further, it is evident that deformations of the underbody V-hull structure are isolated from the crew cab floor, and there was little doorsill motion which could cause injurious floor displacements.

Figure 7:
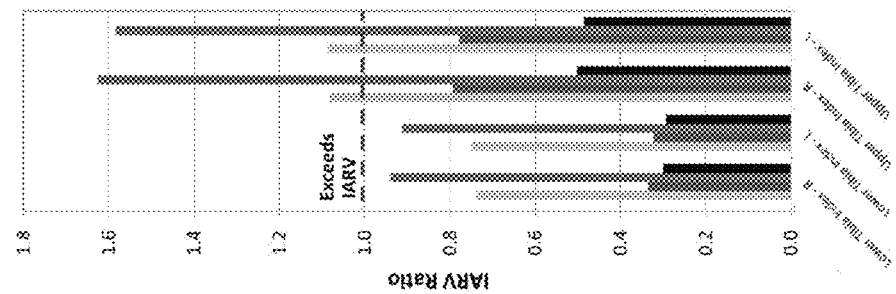
FIG. 7 depicts test results from a simulated test measuring tibia loads when subjected to blast, applying centered and off-centered loads, with and without the EA crush element of the disclosed technology.

Further, based upon simulated testing of the EA crush elements of the disclosed technology, it is evident that the use of such elements with v-hull structures significantly reduces tibia loads to below injury assessment reference values (IARV) for significant injury to the tibia. Results of this simulation are shown in FIG. 7, wherein the first and third bar for each tibia index are without the EA crush element, while the second and fourth bars are with the EA crush element; the first two bars used a 10 kg centered blast, while the third and fourth bars used an 8 kg off centered blast.

While the form of apparatus herein described constitutes preferred embodiments of the present technology, it is to be understood that the invention is not limited to this precise form of apparatus, and that changes may be made therein without departing from the scope of the invention that is defined in the appended claims.

The invention claimed is:

1. An underbody hull for use with an armored vehicle, the structure comprising
an armor hull structure forming a cavity and extending to opposing edges; and
a plurality of reinforcing elements, comprising:
a backbone comprising one or more tubular reinforcing structures extending longitudinally at a base of the armor hull structure, and
a plurality of hull stiffeners, each comprising a tubular reinforcing structure, extending laterally toward top edges of the armor hull structure, wherein each of the hull stiffeners are affixed at one end to the backbone.

2. The underbody hull of claim 1, wherein the reinforcing elements are detached from the armor hull structure.

3. The underbody hull of claim 1, wherein the armor hull structure cavity has a v-shaped cross-section, is made from aluminum, and is de-coupled from the vehicle.

4. The underbody hull of claim 1, wherein the backbone comprises a first pair of tubes, and the tubes of the backbone are adjoined.

5. The underbody hull of claim 4, wherein the tubes of the backbone are made from highly deformable, high strength steel.

6. The underbody hull of claim 4, wherein the backbone further comprises a second pair of tubes, affixed lengthwise at a center to an undersurface of the backbone.

7. The underbody hull of claim 1, the reinforcing elements further comprising a plurality of lateral energy absorbing supports, extending across the top of the armor hull structure cavity.

8. The underbody hull of claim 7, wherein the hull stiffeners and the lateral energy absorbing supports are alternatingly positioned along the length of the armor hull structure.

9. The underbody hull of claim 7, further comprising energy absorber mounts extending along each side of the armor hull structure.

10. The underbody hull of claim 9, further comprising a plurality of energy absorbing crush elements secured to the energy absorber mounts.

11. The underbody hull of claim 10, wherein the energy absorbing crush elements are positioned lateral to the hull stiffeners, and secured to the energy absorber mounts by means of mount bolts.

12. The underbody hull of claim 11, wherein the lateral energy absorbing supports are coupled to the energy absorber mounts by means of affixation bars, and wherein the affixation bars are secured to the energy absorber mounts by means of mount bolts.

13. The underbody hull of claim 9, wherein each of the energy absorber mounts comprise a top beam and a bottom beam, and wherein each of the top and bottom beams have a corresponding angular recess extending along its length to receive an edge of the armor hull structure.

14. The underbody hull of claim 13, wherein the hull stiffeners are secured to the energy absorber mounts by means of a bent plate, having an inclined portion positioned on top of each hull stiffener at an end, and a planar portion extending over the energy absorber mount secured to the mount by mount bolts.

15. An underbody hull for use with an armored vehicle, the structure comprising
an armor hull structure forming a cavity and extending to opposing edges; and a plurality of reinforcing elements comprising a plurality of lateral energy-absorbing supports extending across the top of the armor hull structure cavity.

16. The underbody hull of claim 15, wherein the lateral energy-absorbing supports have a dogbone shape.

17. The underbody hull of claim 15, wherein the reinforcing elements further comprise a backbone comprising one or more tubular reinforcing structures and extending longitudinally at a base of the armor hull structure, and a plurality of hull stiffeners comprising a plurality of tubular reinforcing structures, extending laterally toward top edges of the armor hull structure, wherein each of the hull stiffeners are affixed at one end to the backbone.

18. The underbody hull of claim 15, further comprising energy absorber mounts extending along each side of the armor hull structure, wherein each of the energy absorber mounts comprise a top beam and a bottom beam, and wherein each of the top and bottom beams have a corresponding angular recess extending along its length to receive an edge of the armor hull structure.

19. The underbody hull of claim 18, further comprising a plurality of energy absorbing crush elements secured to the energy absorber mounts.

20. An underbody hull for use with an armored vehicle, the structure comprising
   an armor hull structure forming a cavity and extending to opposing edges;
   a plurality of reinforcing elements; and
   a pair of energy absorber mounts extending along each side of the armor hull structure, wherein each of the energy absorber mounts comprise a top beam and a bottom beam, and wherein each of the top and bottom beams have a corresponding angular recess extending along its length to receive an edge of the armor hull structure and is removably secured, about the edge of the armor hull structure.

21. The underbody hull of claim 20, wherein the reinforcing elements comprise a plurality of lateral energy-absorbing supports extending across a top of the armor hull structure cavity, and coupled with the energy absorber mounts.

22. The underbody hull of claim 20, wherein the reinforcing elements comprise a plurality of tubular reinforcing structures.

23. The underbody hull of claim 22, wherein the tubular reinforcing structures comprise
   a backbone extending longitudinally at a base of the armor hull structure, and
   a plurality of hull stiffeners extending laterally toward top edges of the armor hull structure, wherein each of the hull stiffeners are affixed at one end to the backbone and at an other end to one of the energy absorber mounts.

24. The underbody hull of claim 20, further comprising a plurality of energy absorbing crush elements secured to the energy absorber mounts.

* * * * *